United States Patent [19]

Burgess, Jr.

[11] 4,444,303

[45] Apr. 24, 1984

[54] VIBRATORY FEEDING WORK STATION MODULE AND SYSTEM

[76] Inventor: Warren C. Burgess, Jr., 31922 Lake Rd., Avon Lake, Ohio 44012

[21] Appl. No.: 310,083

[22] Filed: Oct. 9, 1981

[51] Int. Cl.³ .............................................. B65G 47/00
[52] U.S. Cl. .................................... 198/345; 198/472; 198/771
[58] Field of Search .............. 198/345, 472, 750, 752, 198/755, 771

[56] References Cited

U.S. PATENT DOCUMENTS

| | | | |
|---|---|---|---|
| 2,256,700 | 9/1941 | Armstrong | 146/202 |
| 3,315,778 | 4/1967 | Kendall et al. | 198/345 |
| 3,527,087 | 9/1970 | Converse et al. | 198/345 |
| 3,667,590 | 6/1972 | Mead | 198/771 |
| 3,789,711 | 2/1974 | Mead | 83/61 |
| 3,835,983 | 9/1974 | Horii | 198/755 |
| 3,929,221 | 12/1975 | Armstrong | 198/771 |
| 3,931,882 | 1/1976 | Ossbahr | 198/648 |
| 4,050,572 | 9/1977 | Armstrong | 198/347 |
| 4,068,029 | 1/1978 | Armstrong | 428/89 |
| 4,253,559 | 3/1981 | Myers et al. | 198/345 |

*Primary Examiner*—Joseph E. Valenza
*Attorney, Agent, or Firm*—Fay & Sharpe

[57] ABSTRACT

A work station module which includes a buffer storage area for the transitory storage of workpiece carriers which are received at non-specific intervals and an escapement station to facilitate performance of some operation of a workpiece carried by each carrier. The buffer storage area includes a conveying surface which is defined by a plurality of fibers and which is vibrated to move the carriers longitudinally therealong. The resiliency of the fibers permits carriers which are adjacent the escapement station to remain stationary even though the conveying surface is vibrating. At the escapement station, the workpieces are coarsely positioned, lifted from the conveying surface, and accurately positioned and oriented to facilitate performance of the operation. Following the operation, the carrier is returned to the vibrating conveying surface for conveying to the buffer storage area of the next module.

15 Claims, 3 Drawing Figures

VIBRATORY FEEDING WORK STATION MODULE AND SYSTEM

BACKGROUND OF THE INVENTION

This application pertains to the art of workpiece handling and particularly to vibratory feeders for handling and conveying workpieces between successive work or escapement stations.

The invention is particularly applicable to interconnectable modular work stations where each module is particularly adapted to facilitate a specific manufacturing operation or function such as assembly, polishing, drilling, and the like. The work station modules may be connected in a generally linear array such that the workpieces are moved from module to module as each operation or function is performed. It will be appreciated, however, that those skilled in the art may readily adapt the invention to other manufacturing operations as well as to alternative handling and processing arrangements or environments.

Heretofore, various manufacturing assemblies have been devised in which workpieces are placed on a pallet or other carrier and moved automatically from one work station to another. In one such assembly, a series of pallets were adapted for selective engagement with and disengagement from a continuously moving chain. When a pallet reached a work station, it automatically disengaged the chain in anticipation of the operation being performed. Once the operation had been completed, the pallet reengaged the chain and was moved to the next work station. In this system, the pallets tended to be suddenly accelerated and deaccelerated resulting in frequent impacts with each other. Moreover, the equipment utilized was complicated and expensive and was best used for large workpieces such as engine blocks, transmission assemblies, and the like.

Others in the field have suggested disposing independent belt drives between work stations for moving pallets containing workpieces between subsequent work stations. The belt drives may be interrupted between work stations to allow the pallet and attached workpieces to be tipped, rotated, or otherwise have its orientation adjusted to facilitate the next operation. The belts maintained the pallets at fixed intervals which could not be contracted or eliminated. Further, the belts were constrained to moving all pallets along the belt simultaneously and, thus, could not move to receive a pallet at one end without moving to discharge or advance a pallet at the other end. Such systems, again, were complicated, expensive and not well suited to the assembly of moderate or small components.

Vibratory feeders have been used for many years to convey workpieces from one location to another. The jostling movement caused by vibratory feeders is unsuitable for some subassemblies, workpieces, or partially assembled workpieces. For example, if a shallow race containing a plurality of ball bearings were to be transported, the ball bearings would tend to bounce out of the race. A similar problem would tend to arise in the other prior art systems in which the pallets were accelerated or deaccelerated suddenly. It is further known in vibratory feeders to line the feeder with polypropylene fiber material to reduce noise and protect delicate parts.

SUMMARY OF THE INVENTION

The present invention contemplates a new and improved work station module which overcomes the above-referenced problems and others. Each module provides first in-first out handling of workpieces in which later received workpieces are moved independently of earlier received workpieces. The work station modules are easily combined to provide a free flow system and are readily adapted to accommodate a wide variety of workpieces with manual, semi-automatic or automatic operations.

In accordance with the present invention there is provided a work station module which is adapted to facilitate the performance of maufacturing or handling operations and which module is adapted to be interconnected with other modules. The work station module includes a buffer storage area and an escapement station. The buffer storage area provides transitory storage of workpiece carriers which are received at non-specific intervals. The escapement station interacts with each workpiece carrier received from the buffer storage area in a manner facilitating the performance of a manufacturing or handling operation on a carried workpiece.

In accordance with another aspect of the invention, the buffer storage area includes a fiber covered conveying surface which is vibrated for moving workpiece carriers from an upstream end toward the escapement station.

A principal advantage of the present invention is that workpieces are started, stopped, and conveyed smoothly, quietly, and quickly between escapement or work stations without disrupting partially assembled or manufactured workpieces. The workpieces are conveyed at two to four times the speed of normal vibratory feeders.

Another primary advantage of the present invention is that workpiece carriers or boats are started, conveyed, and stopped on a conveying surface virtually without wear on the carriers or conveying surface.

Another advantage of the invention resides in the provision of a work station module which may be readily interconnected with similar modules to facilitate performing a preselected sequence of manufacturing operations.

A further advantage of the invention is in the provision of a free flow or free wheeling type system where each of the interconnected station modules handles the workpieces independently of the other modules.

Yet another advantage of the invention is that it provides means which are readily adapted or converted to performing a variety of workpiece operations such as assembling, drilling, polishing, inspecting, and the like.

Still further advantages will become readily apparent to those skilled in the art upon reading and understanding the following detailed description.

BRIEF DESCRIPTION OF THE DRAWINGS

The invention may take physical form in certain parts and arrangements of parts, a preferred physical arrangement or embodiment of which will be described with reference to the accompanying drawings wherein.

DETAILED DESCRIPTION OF THE PREFERRED EMBODIMENT

Figure 1:
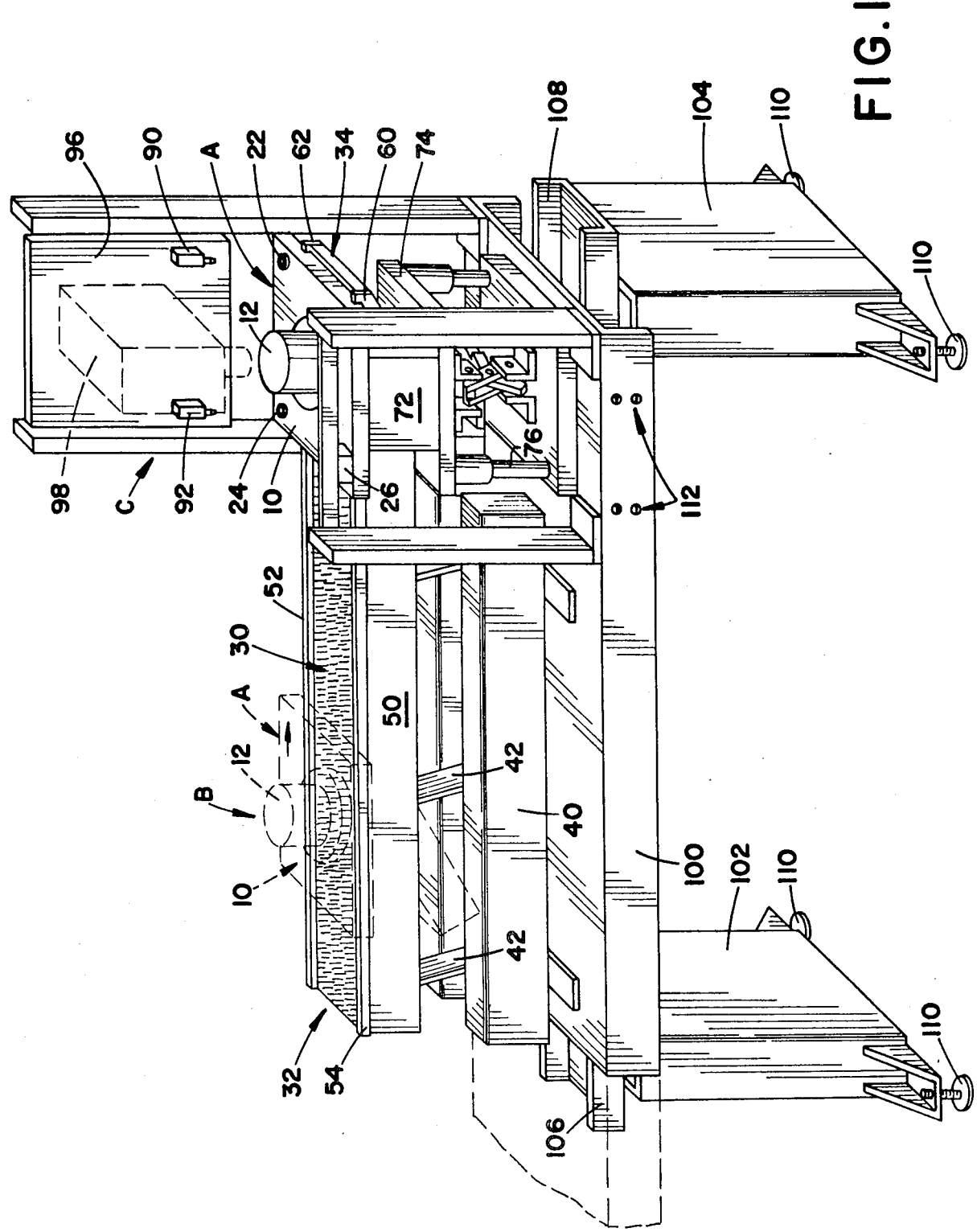
FIG. 1 is a perspective view of a work station module constructed in accordance with the present invention.

Referring now to the drawings wherein the showings are for purposes of illustrating the preferred embodiment only and not for purposes of limiting same, FIG. 1 illustrates a work station module for handling a plurality of workpiece carriers A. The module includes a buffer storage area B for transitory storage of a plurality of the carriers which it receives at non-specific intervals and an escapement station C which facilitates performance of a manufacturing operation on the workpiece carried by each carrier. The interval between operations of the escapement station is not necessarily coextensive with the interval between receiving workpiece carriers. The escapement station operates on a "permissive" type cycle in which it commences an operation in response to Its completion of the preceding operation rather than in response to the cycling of another machine or escapement station. This allows the escapement station to cycle at the highest speed possible for the operation which it performs.

Figure 2:
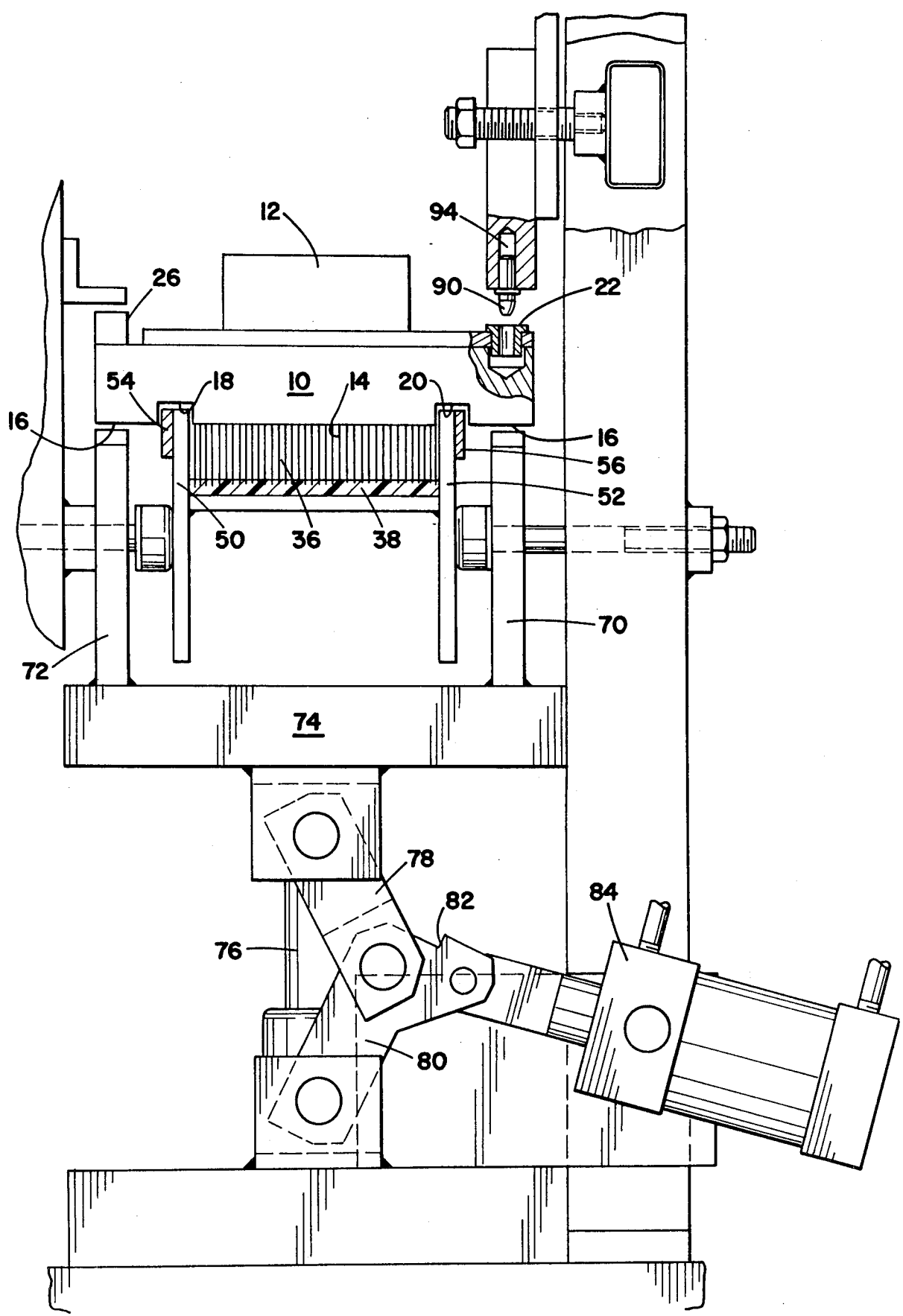
FIG. 2 is an end elevational view of an escapement station of the module of FIG. 1; and, FIG. 3 is a diagrammatic top plan view of a plurality of work station modules interconnected into a linear free flow manufacturing and assembly system.

With reference to FIGS. 1 and 2, the workpiece carriers or boats A include a wide flat base 10 on which at least one nest 12 or other means for mounting a workpiece is disposed. Optionally, a plurality of nests may be provided to allow the escapement sation to operate simultaneously on a plurality of workpieces per carrier. For simplicity of illustration, the nest 12 is shown in the form of a hollow cylinder disposed on the upper surface of the carrier for holding the workpieces. Other workpiece mounting means such as threaded bores in the base 10 to receive bolts through the workpieces, bores in the base to receive pins projecting from the workpieces, magnets imbedded in the base, spring clips mounted on the base, and the like are also contemplated for mounting the workpieces on the carrier with a preselected orientation and position.

As shown in FIG. 2, the carrier has a planar, engaging surface which, optionally, may be abraded or grooved. The engaging surface includes a buffer storage area engaging portion 14 and an escapement station engaging portion 16. The carrier also includes a guide means for guiding the position and orientation of the carrier relative to the buffer storage area B and the escapement station C. This guide means includes a buffer storage area guide means which, in the preferred embodiment, comprises a pair of guides or slots 18 and 20 that divide the buffer storage area and escapement station engaging portions 14 and 16, respectively. The guide means further includes an escapement station guide means comprised of a pair of hardened pin receiving bushings 22 and 24 disposed on the upper surface of the carrier base 10. Optionally, the base may carry an encoding means 26 for carrying coded identification of the workpiece and the operation to be performed. The coded identification may be optically or color encoded, magnetically encoded, mechanically encoded or the like.

Continuing with reference to FIGS. 1 and 2, the buffer storage area B includes a conveying surface 30 along which workpieces are moved from a first or upstream end 32 toward a second or downstream end 34. The conveying surface 30 is defined by a multiplicity of fibers 36 which project from a layer of resilient plastic layer 38. One end of each fiber is imbedded in the plastic layer 38 and the free end is adapted to engage the buffer storage engaging surface 14 of the carriers A. As is already known, the fibers slope a few degrees from vertical with the free ends thereof being angled toward the downstream end 34 of the buffer storage area. In the preferred embodiment, the fibers are polypropylene, although other resilient, wear-resistant fibers may be used to advantage.

A motivating means, including a motor 40 and a plurality of leaf springs 42 which connect the motor and the conveying surface, selectively causes the conveying surface to undergo a mode motion which includes vertical and longitudinal components of motion. In the preferred embodiment, a major component of the motion is along a line about 15 to 20 degrees from horizontal. The motivating means urges the fibers against the carrier causing the fibers to buckle slightly and raise the carrier as they attempt to resume their straight characteristic. This vibration of the inclined, resilient fibers results in a quite, abrasion-free conveying action.

The buffer storage area B further includes directing means for interacting with the buffer storage area guide means of the carriers A for directing them along the conveying surface 30. In the preferred embodiment, this directing means includes a first directing rail 50 which is received in first guide 18 of the carrier and a second directing rail 52 which is received in the second guide 20 of the carrier. The first and second rails, in the preferred embodiment, have friction reducing surfaces 54 and 56, respectively, of TEFLON, NYLON, fibers, or the like for inhibiting lateral movement of the carriers. The rails 50 and 52 are connected with the conveying surface 30 to undergo vibratory motion therewith. Optionally, the rails may be mounted stationary with respect to the conveying surface.

In the preferred embodiment shown, the carrier is supported directly by the fibers 36 and not by the rails 50 and 52. Because each carrier is supported directly on the fibers, the directing means may take other forms than a pair of side rails, e.g., a single rail located longitudinally along the center of the conveying surface and received in a central groove in the carrier or the like. Alternately, bearings or rollers may be provided between the guides 18 and 20 and the top surface of rails 50 and 52 to enable the carriers to be supported on the rails. Supporting the carrier on the rails is primarily advantageous in the alternate embodiment in which the rails remain stationary as the conveying surface vibrates. It is to be appreciated that the fibers 36 are able to carry relatively heavy loads, on the order of five pounds or so per square inch of carrier base 10. The load carrying capability does, however, vary with the fiber density, and the composition and denier of the fibers.

Still referring to FIGS. 1 and 2, the escapement station C is disposed downstream from the buffer storage area B toward the second end 34 of the conveying surface 30. It will be appreciated that the escapement station may take various forms which are particularly adapted to perform selected workpiece operations. An escapement station positioning means includes a coarse or initial positioning means for positioning each carrier in a generally preselected position and a precise positioning means for precisely fixing the position of the carrier relative to the escapement station. In the preferred embodiment, the coarse positioning means includes a pair of retractable upward projecting tabs 60 and 62 which selectively engage the leading edge of the carrier. Optionally, a detector, such as a pressure activated switch or photocell may be used to detect engagement of the coarse positioning means by a carrier. A conveying surface disengaging means, in the preferred embodiment, selectively disengages or lifts the coarsely positioned carrier from the conveying surface 30. This prevents an operation performed at the escapement station from interfering with the vibratory motion of the conveying surface. Alternately, the carrier may be positioned and the escapement station operation performed without removing the carrier from the fiber conveying surface.

Further to the preferred embodiment, the disengaging means includes a pair of lifting arms 70 and 72 having upper surfaces adapted to engage the work station engaging surfaces 16 of the carrier. The lifting arms 70 and 72 are mounted on a platen 74 which is slidably mounted on posts or guides 76 for movement between a carrier lifting position and a carrier lowering position. A pivotal linkage assembly including a first link 78 which is pivotally connected with the platen 74 and a second link 80 which is pivotally connected with the first link 78 and with a stationary base is employed to move the platen 74 between its lifting and lowering positions. Second link 80 includes a locking surface 82 for locking the links in their lifting position. The lengths of links 78 and 80 are chosen such that when the platen 74 is in the carrier lifting position, the links are disposed with their longitudinal axes aligned to thereby accommodate supporting a relatively great weight or pressure without tending to pivot. When the platen 74 is in the carrier lowering position, the linkage assembly is pivoted to the side for causing the effective length of the linkage assembly to be shorter. A pneumatic or hydraulic cylinder 84 is conveniently employed to selectively move the linkage assembly between its lifting and lowering positions.

The escapement station precision positioning means precisely positions the carrier in a preselected position and orientation such that an automatic device can thereafter precisely locate the workpiece for allowing some operation to be performed thereon. In the preferred embodiment, the precision positioning means includes a pair of hardened pins 90 and 92 which are adapted to be received in bushings 22 and 24, respectively, and wherein the disengaging means moves the carrier to the positioning pins. Alternately, the positioning pins may be moved into engagement with the carrier. If desired, the pins 90 and 92 may be connected with a switch for indicating that the carrier is positioned to start the escapement operation. The escapement station further includes an escapement mounting means 96 for mounting an apparatus or tool 98 which performs some preselected operation. The mounting means 96 may take any number of different forms and is adapted to cooperate with the specific apparatus or tool 98 selected and/or required. Optionally, the escapement station may include a separating means, such as a toggle lever or stop, for separating each received carrier from other carriers which are disposed in the buffer storage area B. As another option, the escapement station may include a decoder for decoding the identification encoded on encoding means 26 and for causing a corresponding operation to be performed by the escapement station.

As shown in FIG. 1, the buffer storage area B and escapement station C are mounted on a frame structure which includes a horizontal supporting portion 100 and a pair of supports 102 and 104. These supports include horizontal supporting members 106 and 108 extending therebetween for supporting the horizontal supporting portions of a pair of adjacent modules. Leveling means 110 are advantageously provided to facilitate adjustment of conveying surface 30 to a substantially horizontal position. Various interconnecting means such as bolt holes 112 and the like allow each module to be accurately aligned and interconnected with an adjacent module.

In the free flow system, each carrier or boat A is received at the upstream end 32 of the conveying surface 30 of one or a first of the modules and is moved therealong by the vibratory motion of the fibers 36. Upon abutting another carrier in the buffer storage area B, the carrier stops moving an the fibers buckle and extend without moving the carrier forward. When the escapement station has completed a manufacturing operation, the disengaging arms 70 and 72 lower the carrier from the escapement station C onto the vibrating conveyor surface. The carrier is then conveyed downstream along the conveying surface of the next adjacent module toward the buffer storage area thereof. The lead carrier in the buffer storage area of the one or first module is simultaneously conveyed into the escapement station with the foregoing operational steps then being repeated.

It will be appreciated that the carriers are moved independently of the operation of other escapement stations. If an escapement station takes abnormally long to perform its operation, more carriers are accumulated in the buffer storage area of that module. Conversely, if the manufacturing operation is performed quickly, the number of carriers in the buffer storage area is reduced. In this manner, fluctuations in the time required for performing manufacturing operations at any modules in the line do not affect operation of the other modules. For example, in a ten operation free-flowing assembly syste, if each of the ten escapement stations operates with 95% productivity, the productivity of the free-flowing assembly system is substantially 95%. By contrast in a ten operation non-free-flowing system in which each of the operations has a 95% productivity, the productivity of the system is $0.95^{10}$ to 59.9%. In an assembly system which produces 60 parts per minutes, over 2½ million additional parts per year are produced by the free-flowing assembly system.

Figure 3:
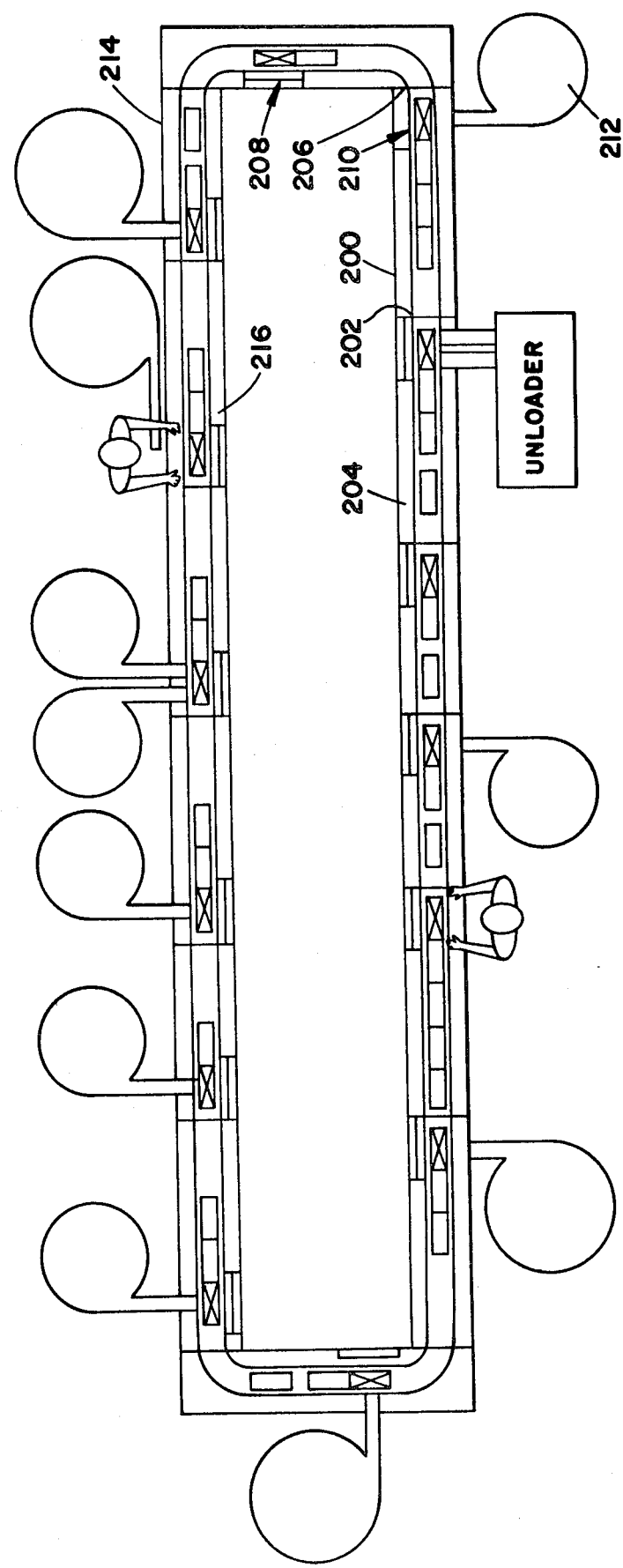

Referring now to FIG. 3, a free flow system is illustrated which is made up of a plurality of the modules of FIG. 1. The work station modules are interconnected in a closed loop so that each carrier may circulate sequentially from escapement station to escapement station independently of the movement of the other carriers. A work station module 200 has an upstream end 202 at which it receives workpiece carriers from a preceding module 204 and a downstream end 206 at which it discharges carriers to a subsequent module 208. The module 200 includes an escapement station 210 at which an operation is performed. In the example of FIG. 3, the escapement station 210 includes a vibratory bowl feeder 212 for orienting and feeding components to be added to the workpiece held on each carrier. An exemplary operation may be placing a bearing race into the nest 12 of the carrier. As a further example, the subsequent work station module 208 might grease the race, a later work station module 214 may add a plurality of bearings to the race, and so on. The work station modules may be automatic as illustrated by modules 200, 208, and 214, or may be manual as illustrated at module 216. In a manual operated module, each carrier is held in the escapement station as an operation performs a manual assembly operation, inspection, or the like. Further, if one of the automated modules malfunctions, the automatic tool may be disconnected so that an operator may perform the same manufacturing operation manually.

It will be appreciated that the modules may be connected in other than a linear line. For example, if several of the operations to be performed by the escapement means take longer than the others, a switching means may connect the second end of one of the modules with a pair of lines of interconnected modules such that alternate carriers are conveyed into each of the two parallel lines. At the end of the parallel lines, all carriers may be fed to the first end of a common module such as with a Y connection. The modules may be interconnected in various arrangements of linear paths, parallel paths, bypasses, and the like as required by the operation to be performed.

The invention has been described with reference to the preferred and alternative embodiments. Clearly, modifications and alterations will become apparent to others upon a reading and understanding the preceding detailed description. It is intended to include all such modifications and alterations insofar as they come within the scope of the appended claims or the equivalents thereof.

Having thus described the invention, it is now claimed:

1. A system for conveying workpieces comprising:
a plurality of workpiece carriers for carrying workpieces, each workpiece carrier including a lower surface in which at least one guide slot is defined, the guide slot including an inner surface and a pair of oppositely disposed side surfaces;
a generally horizontal conveying surface along which the workpiece carriers are moved, the conveying surface including a multiplicity of resilient fibers projecting upwardly therefrom to engage the workpiece carrier lower surfaces and to support the workpiece carriers;
a directing rail mounted on the conveying surface and extending upwardly beyond the fibers, the directing rail having at least one generally vertical friction reducing surface, the directing rail being loosely received in the guide slot and displaced from the guide slot inner surface such that the resilient fibers support the workpiece carriers and the directing rail intermittently engages the guide slot side surfaces as the workpiece carrier becomes misaligned; and,
motivating means for vibrating the conveying surface and directing rail, such that the carriers move along the resilient fibers.

2. The conveying system as set forth in claim 1 wherein each workpiece carrier has at least one nest for receiving and holding a workpiece.

3. The conveying system as set forth in claim 2 wherein each workpiece carrier has a positioning means for accurately indexing the position of the workpiece carrier, the nest being disposed in a predetermined relationship with the guide means such that the position of the carried workpiece is accurately indexed.

4. A work station module to facilitate the handling of workpiece carriers which have a lower surface in which at least one guide slot is defined, the module comprising:
a buffer storage area disposed adjacent an upstream end of the work station module for transitory storage of a plurality of workpiece carriers which are received at non-specific intervals, the buffer storage area including a conveying surface along which workpiece carriers are urged downstream from the upstream end, the conveying surface including a multiplicity of resilient fibers projecting upwardly therefrom for engaging a lower engaging surface of the carriers, a diverting rail mounted on the conveying surface and extending upwardly beyond the fibers, the directing rail having at least one generally vertical friction reducing surface, the directing rail being loosely received in the guide slot and displaced from a guide slot inner surface such that the resilient fibers support the workpiece carriers and the directing rail intermittently engages guide slot side surfaces as the workpiece carrier becomes misaligned;
an escapement station for facilitating the performance of an operation on a workpiece carried by each workpiece carrier, the escapement station being disposed adjacent a downstream end of the work station module and including disengaging means for selectively lifting each carrier from the resilient fibers such that the resilient fibers are not damaged during the performance of the operation on a workpiece disposed on the lifted carrier; and,
motivating means for selectively causing the conveying surface and directing rail to move with a component of motion such that the interaction of the fibers and the lower engaging surfaces of the carriers propels the carriers along the conveying surface from the upstream end toward the escapement station.

5. The work station module as set forth in claim 4 further including a second directing rail, the directing rails being disposed along the sides of the conveying surface and each being received in a corresponding guide slot in the carriers.

6. The work station module as set forth in claim 4 wherein the motivating means causes the conveying surface to undergo linear vibratory motion.

7. The work station module as set forth in claim 6 wherein the motivating means further causes the directing means to undergo linear vibratory motion with the conveying surface.

8. The work station module as set forth in claim 4 wherein the escapement station further includes positioning means for positioning a carrier relative to the escapement station.

9. The work station module as set forth in claim 8 wherein the positioning means includes a coarse positioning means for positioning a carrier generally in a predetermined position and orientation in the escapement station before the disengaging means disengages the carrier from the fibers.

10. The work station module as set forth in claim 8 wherein the positioning means includes a precision positioning means for precisely fixing the position and orientation of the carrier relative to the escapement station to facilitate accurate and precise performance of the operation at the escapement station.

11. A work station module which is adapted to facilitate the performance of a manufacturing operation and to be interconnected with work station modules, said work station module comprising:
a conveying surface along which workpiece carriers are moved from a first end toward a second end, each carrier including a lower surface in which at least one guide slot is defined, the guide slot including an inner surface and a pair of oppositely disposed side surfaces;

the conveying surface including a multiplicity of resilient fibers projecting outwardly therefrom to support the workpiece carriers;

a directing rail mounted on the conveying surface and extending upwardly beyond the fibers, the directing rail having at least one generally vertical friction reducing surface, the directing rail being loosely received in the guide slot and displaced from the guide slot inner surface such that the resilient fibers support the workpiece carriers and the directing rail intermittently engages the guide slot side surfaces as the workpiece carrier becomes misaligned;

motivating means for continuously causing the conveying surface to urge the carriers along the conveying surface from the first end toward the second end;

carrier disengaging means for (i) selectively disengaging at least one carrier from the conveying surface for performance of an operation on a workpiece disposed on the disengaged carrier, (ii) blocking the remaining carriers on the conveyed surface from being conveyed past the disengaging means to the conveying surface second end under the continuous urging of the motivating means during the performance of the operation, and (iii) returning the disengaged carrier to the conveying surface to be conveyed to the conveying surface second end as another carrier is conveyed to the carrier disengaging means; and, positioning means for positioning the disengaged carrier in a preselected position, whereby disengaging the carriers from the resilient fibers during the performance of the operation protects the fibers.

12. The work station module as set forth in claim 11 wherein the motivating means causes the conveying surface to undergo vibratory motion.

13. The work station module as set forth in claim 12 wherein the conveying surface further includes a resilient base disposed at least partially below the fibers for resiliently supporting them.

14. The work station module as set forth in claim 13 wherein the fibers are partially imbedded in a resilient base.

15. A free flow assembly system made up of a plurality of interconnected work station modules around which workpiece carriers are circulated, each workpiece carrier including a lower surface in which at least one guide slot is defined, the system including a first work station module connected at an upstream end with a preceding work station module and connected at a downstream end with a subsequent work station module and there being additional work station modules operatively connected between said subsequent work station module and said preceding work station module such that the work station modules form a closed loop;

(a) said first work station module including:
 (i) a first buffer storage area for transitory storage of a plurality of the workpiece carriers which are received at non-specific intervals from the preceding work station module, said first buffer storage area including a first conveying surface having a multiplicity of generally upward projecting fibers for engaging the workpiece carriers, a first directing rail mounted on the first conveying surface and extending upwardly beyond the fibers, the first directing rail having at least one generally vertical friction reducing surface, the first directing rail being loosely received in the carrier guide slots and displaced from guide slot inner surfaces such that the resilient fibers support the workpiece carriers and the first directing rail intermittently engages guide slot side surfaces as the workpiece carriers become misaligned, and first motivating means for selectively causing the first conveying surface to vibrate, said first buffer storage area being disposed adjacent the upstream end of the first work station module; and,
 (ii) an escapement station for selectively disengaging at least one carrier from the conveying surface to facilitate the performance of an operation on a workpiece carried by each workpiece carrier, the escapement station being disposed toward the downstream end of the first work station module for receiving carriers from the buffer storage area for performing the operation thereon and for discharging carriers after the performance of the operation to the upstream side of the subsequent work station module;

(b) said preceding work station module including:
 (i) a preceding module conveying surface having a multiplicity of resilient fibers projecting outwardly therefrom to engage the workpiece carriers, a preceding module directing rail mounted on said preceding module conveying surface and extending upwardly beyond the fibers, said preceding module directing rail having at least one generally vertical friction reducing surface, said preceding module directing rail being loosely received in the carrier guide slots and displaced from the guide slot inner surfaces such that the resilient fibers support the workpiece carriers and said preceding module directing rail intermittently engages the guide slot side surfaces as the workpiece carriers become misaligned;
 (ii) a preceding module motivating means for selectively causing the preceding module conveying surface to urge the workpiece carriers therealong; and,
 (iii) a preceding module carrier disengaging means for selectively disengaging at least one carrier from the preceding module conveying surface; and, (c) said subsequent work station module including;
 (i) a subsequent module conveying surface having a multiplicity of resilient fibers projecting outward therefrom for engaging the workpiece carriers, a subsequent module directing rail mounted on said subsequent module conveying surface and extending upwardly beyond the fibers, said subsequent module directing rail having at least one generally vertical friction reducing surface, said subsequent module directing rail being loosely received in the guide slots and displaced from the guide slot inner surfaces such that the resilient fibers support the workpiece carriers and said subsequent module directing rail intermittently engages guide slot side surfaces as the workpiece carriers become misaligned;
 (ii) a subsequent module motivating means for selectively causing the subsequent module conveying surface to urge the carriers therealong; and,
 (iii) a subsequent module carrier disengaging means for selectively disengaging at least one carrier from the subsequent module conveying surface.

* * * * *